United States Patent [19]

Saeki et al.

[11] Patent Number: 4,698,370

[45] Date of Patent: Oct. 6, 1987

[54] PRODUCTION OF PHENOLIC RESIN COMPOSITE FOAM

[75] Inventors: Yukio Saeki; Naomitsu Inoue; Yukio Tokunaga, all of Fujieda, Japan

[73] Assignee: Sumitomo Durez Company, Ltd., Tokyo, Japan

[21] Appl. No.: 851,185

[22] Filed: Apr. 14, 1986

[51] Int. Cl.[4] ............................................. C08J 9/10
[52] U.S. Cl. ..................................... 521/128; 521/54; 521/94; 521/97; 521/130; 521/181; 521/909; 523/218; 523/219
[58] Field of Search ................... 521/128, 94, 909, 97, 521/130, 181, 54; 523/218, 219

[56] References Cited

U.S. PATENT DOCUMENTS

| | | |
|---|---|---|
| 2,993,871 | 7/1961 | Shannon et al. ..................... 521/181 |
| 3,784,487 | 1/1974 | Franck et al. ....................... 521/181 |
| 4,252,908 | 2/1981 | Paladini .............................. 521/181 |
| 4,275,170 | 6/1981 | McAllister et al. ................. 521/181 |
| 4,309,527 | 1/1982 | McAllister et al. ................. 521/181 |

Primary Examiner—Morton Foelak
Attorney, Agent, or Firm—James F. Tao; James F. Mudd

[57] ABSTRACT

A phenolic resin composite foam is disclosed which is prepared by heating and foaming a novolak phenolic resin having a number average molecular weight of 250 to 600 and a bulk density of 0.15 to 0.5, a blowing agent, a blowing auxiliary compound and inorganic foamed particles. Additional materials for flame retardancy can be added. The foam produced has a high compressive strength, a high foaming and rapid curing rates, a low water absorption and a minimum of friability.

8 Claims, No Drawings

PRODUCTION OF PHENOLIC RESIN COMPOSITE FOAM

BACKGROUND OF THE INVENTION

The present invention concerns a process for the production of an improved phenolic resin composite foam.

The phenolic resin foams are superior in heat-resisting properties, such as flame resistance and smoke resistance, to other plastic foams. Phenolic foams are light in weight and low in thermal conductivity. Because of these properties, phenolic foam is used in a great variety of heat insulating applications, but is limited to other application areas because it is poor in compressive strength, flexibility, adhesion to metals and its corrosive nature to metals.

There is disclosed in, for example, Japanese Patent Publication No. 42215/1983 a process for producing a lightweight heat insulating material by incorporating a thermosetting resin such as phenolic resin with inorganic foamed particles.

However, the conventional process for producing a phenolic resin foam by mixing a phenolic resin with perlite, vermiculite, obsidian, shirasu balloon, or the like is extremely slow in foaming and curing rates. In addition, this type of foam is low in compressive strength, high in water absorption, and friable because of the poor bonding between the phenolic resin and the inorganic foamed particles.

In order to overcome the above-mentioned disadvantages of conventional phenolic resin foams, the present inventors conducted a research program, which led to the finding that it is possible to produce a foam having a high compressive strength, a low water absorption, and a minimum of friability at high foaming and curing rates, by combining a specific phenolic resin, a blowing agent, a blowing auxiliary, and inorganic foamed particles with one another.

SUMMARY OF THE INVENTION

A phenolic resin composite foam having high compressive strength, a high foaming and rapid cure rates, a low water absorption and a minimum of friability has been obtained. The foam is produced by combining a powdered novolak resin having a number average molecular weight of 250 to 600 and a bulk density of 0.15 to 0.5, with a blowing agent, a blowing auxiliary and inorganic foamed particles.

DETAILED DESCRIPTION OF THE INVENTION

This invention is concerned with producing phenolic resin composite foam. In this application, phenolic composite foam is defined as a foam containing a phenolic resin, and inorganic foamed particles which have been premixed and the phenolic resin is reacted with a blowing agent and cured forming a foam composed of inorganic foamed materials and a foamed resin.

The phenolic resin used in this invention is a powdered novolak phenolic resin. It is prepared by crushing the thermoplastic condensation product formed by reacting one or more than one kind of phenol with one or more than one kind of aldehyde in the presence of an acid catalyst. Usually it is cured with a hardener such as hexamethylenetetramine (referred to as hexamine hereinafter).

The phenol used as a raw material for the phenolic resin includes phenol, cresol, xylenol, resorcinol, hydroquinone, p-t-butylphenol, and the like. It may also include those phenols modified with aniline, urea, melamine, or cashew. The aldehyde includes formalin, paraformaldehyde, acetaldehyde, furfural, and the like. The acid catalyst includes sulfuric acid, hydrochloric acid, phosphoric acid, and other inorganic acids; and formic acid, oxalic acid, acetic acid, p-toluene-sulfonic acid, and other organic acids.

The powdered novolak phenolic resin should have a number-average molecular weight of 250 to 600, preferably 300 to 550. With a number-average molecular weight lower than 250, the phenolic resin is liable to cake during storage and to undergo hardening and foaming reactions which are undesirable for good foams of compact cell structure. With a number-average molecular weight in excess of 600, the phenolic resin is slow in hardening and foaming reactions and does not form a foam having a high expansion ratio.

The powdered novolak phenolic resin should contain free phenol in an amount of 1 to 10%, preferably 3 to 8%. If the amount of free phenol is less than 1%, the foaming reaction is slow and the resulting foam does not have a satisfactory expansion ratio. If the amount of free phenol is more than 10%, the foaming reaction is vigorous and the resulting foam is poor.

The powdered novolak phenolic resin should have a bulk density of 0.15 to 0.50. With a bulk density lower than 0.15, the phenolic resin is liable to cake during storage. With a bulk density in excess of 0.50, the phenolic resin does not provide a foam of compact cell structure.

The blowing agent is a substance that generates a gas upon heating. Examples of the blowing agent that can be used in this invention include dinitrosopentamethylenetetramine, azodicarbonamide, p-toluenesulfonylhydrazide, benzenesulfonylhydrazide, azobisisobutyronitrile, sodium bicarbonate, and ammonium carbonate.

The blowing agent should be added in an amount of 3 to 20 parts by weight per 100 parts by weight of phenolic resin.

The blowing auxiliary specially used in this invention produces a remarkable effect on the foaming and curing rates and on the adhesion between the phenolic resin and the inorganic foamed particles after blowing. Examples of the blowing auxiliary that can be used in this invention include urea, formic acid, oxalic acid, maleic acid, fumaric acid, benzoic acid, salicylic acid, p-hydroxybenzoic acid, and phthalic acid. It is added in an amount of 0.1 to 7 parts by weight per 100 parts by weight of phenolic resin. With an amount less than 0.1 parts by weight, the blowing auxiliary is not effective, and if the amount is in excess of 7 parts by weight, the phenolic resin has a low crosslink density after the curing and foaming reactions performed by heating.

The inorganic foamed particles used in this invention are perlite, vermiculite, obsidian, shirasu balloon, or the like. One having a bulk density of 0.05 to 0.50 and a particle diameter of 0.2 to 7 mm is desirable. The mixing ratio of the phenolic resin to the inorganic foamed particles should be 90/10 to 10/90 by weight, preferably 70/30 to 30/70 by weight. If the mixing ratio is greater than 90/10, the resulting foam is poor in flame resistance and compressive strength. If it is smaller than 10/90, the adhesion between the phenolic resin and the inorganic foamed particles is poor and the resulting foam has a low compressive strength and a high water absorption.

In the process of this invention, the foam composition may be incorporated with a variety of flame retardants such as halogen compounds (e.g., tetrabromobisphenol A, hexabromobenzene, Dechlorane, and chlorinated paraffin), phosphorus compounds (e.g., triphenyl phosphate and cresyldiphenyl phosphate) and boron compounds (e.g., borax and boric acid). In addition, the foam composition may be incorporated with a variety of anionic, nonionic, and cationic surface active agents in order to produce the compact cell structure.

The phenolic resin composite foam composition is obtained by mixing a phenolic resin, a blowing agent, a blowing auxiliary, and inorganic foamed particles with one another using a mixer. It is also possible to add a blowing agent, blowing auxiliary, hardener, flame retardant, and surface active agent to the polycondensation system for the phenolic resin. Alternatively, the foam composition may be prepared by mixing the above-mentioned components with a phenolic resin using a roll, crushing the resulting product into a powder having a bulk density of 0.15 to 0.50 using a crusher, and mixing the resulting powder with inorganic foamed particles.

The phenolic resin composite foam material thus obtained is filled in a mold of prescribed shape, and the mold is heated to 100 to 250° C. for 2 to 60 minutes for curing and foaming by using a heating furnace or hot press. In this way there is obtained a phenolic resin composite foam.

If the heating temperature is lower than 100° C., the phenolic resin composite foam material is low in the reaction rate of curing and foaming and the resulting foam is poor in compressive strength. If the heating temperature is higher than 250° C., the curing and foaming take place at such a high rate that a foam of compact cell structure is not obtained.

The process of this invention produces a phenolic resin composite foam superior to the conventional foam in that the curing and foaming rates are higher and the resulting foam has a higher compressive strength, a lower water absorption, and a minimum of friability. It is suitable for the industrial production of a phenolic resin composite foam.

The invention is now described in more detail with reference to the following non-limitative examples, in which "parts" and "%" means "parts by weight" and "wt %", respectively.

PRODUCTION EXAMPLE 1

In a reaction vessel equipped with a reflux condenser and stirrer were charged 1000 parts of phenol, 690 parts of 37% formalin, and 2 parts of 35% hydrochloric acid. Reaction was carried out under reflux at 95 to 100° C. for 4 hours, and the reaction product was dehydrated under vacuum for about 5 hours, followed by cooling and discharging. Thus there was obtained a white solid novolak phenolic resin having a melting point of 85° C. and a number-average molecular weight of 400 and containing 6.0% of free phenol. This resin was crushed by using a crusher to give a powdery novolak phenolic resin having a bulk density of 0.25.

COMPARATIVE PRODUCTION EXAMPLE 1

In a reaction vessel equipped with a reflux condenser and stirrer were charged 1000 parts of phenol, 518 parts of 37% formalin, and 2 parts of 35% hydrochloric acid. Reaction was carried out under reflux at 95 to 100° C. for 3 hours, and the reaction product was dehydrated under vacuum for about 5 hours, followed by cooling and discharging. Thus there was obtained a white solid novolak phenolic resin having a melting point of 68° C. and a number-average molecular weight of 245 and containing 12% of free phenol. This resin was crushed by using a crusher to give a powdered novolak phenolic resin having a bulk density of 0.35.

COMPARATIVE PRODUCTION EXAMPLE 2

In a reaction vessel equipped with a reflux condenser and stirrer were charged 1000 parts of phenol, 750 parts of 37% formalin, and 1.5 parts of 35% hydrochloric acid. Reaction was carried out under reflux at 95 to 100° C. for 3 hours, and the reaction product was dehydrated under vacuum for about 5 hours, followed by cooling and discharging. Thus there was obtained a white solid novolak phenolic resin having a melting point of 91° C. and a number-average molecular weight of 662 and containing 0.7% of free phenol. This resin was crushed by using a crusher to give a powdered novolak phenolic resin having a bulk density of 0.13.

EXAMPLE 1

A phenolic resin composite foam material was prepared by mixing the following components for 30 minutes in a V-blender:
100 parts of the powdered novolak phenolic resin obtained in Production Example 1.
10 parts of hexamethylenetetramine as a hardener.
10 parts of dinitrosophentamethylenetetramine as a flowing agent.
2 parts of benzoic acid as a blowing auxiliary.
5 parts of aluminum hydroxide as a flame retardant.
1 part of "Pronone 208" (a product of Nippon Oils & Fats Co., Ltd) as a surface active agent.
220 parts of perlite "Fuyo #7" having a bulk density of 0.07 (a product of Fuyo Light Co., Ltd.).

The composite foam material was filled in a mold measuring 40 cm long, 35 cm wide, and 5 cm deep. The mold was heated at 180° C. for 3 minutes using a hot press to effect curing and foaming. Thus there was obtained a phenolic resin composite foam of compact cell structure.

COMPARATIVE EXAMPLE 1

A phenolic resin composite foam material was prepared by mixing the following components for 30 minutes in a V-blender:
100 parts of the powdered novolak phenolic resin obtained in Comparative Production Example 1.
10 parts of hexamethylenetetramine as a hardener.
10 parts of dinitrosopentamethylenetetramine as a blowing agent.
5 parts of aluminum hydroxide as a flame retardant.
1 part of "Pronone 208" as a surface active agent.

220 parts of perlite "Fuyo #7".
The composite foam material was filled in a mold measuring 40 cm long, 35 cm wide, and 5 cm deep. The mold was heated at 180° C. for 3 minutes using a hot press to effect curing and foaming. Thus there was obtained a phenolic resin composite foam.

COMPARATIVE EXAMPLE 2

A phenolic resin composite foam was obtained in the same manner as in Comparative Example 1, except that the heating temperature and time was changed to 180° C. and 7 minutes, respectively.

COMPARATIVE EXAMPLE 3

A phenolic resin composite foam was obtained in the same manner as in Comparative Example 1, except that the powdered novolak phenolic resin obtained in Comparative Production Example 2 was used.

COMPARATIVE EXAMPLE 4

A phenolic resin composite foam was obtained in the same manner as in Comparative Example 2, except that the powdered novolak phenolic resin obtained in Comparative Production Example 2 was used.

Table 1 shows the characteristic values of the phenolic resins obtained in Production Example 1 and Comparative Production Examples 1 and 2. Table 2 shows the characteristic values of the phenolic resin composite foams obtained in Example 1 and Comparative Examples 1, 2, 3, and 4.

TABLE 1

Characteristic Properties of Phenolic Resin

| Physical properties | Production Example 1 | Comparative Production Example 1 | Comparative Production Example 2 |
|---|---|---|---|
| Number-average molecular weight | 400 | 245 | 662 |
| Free phenol (%) | 6.0 | 12 | 0.7 |
| Bulk density | 0.25 | 0.35 | 0.13 |

Test methods employed in Table 1 and 2:
(1) Characteristic properties of phenolic resin.
Number-average molecular weight: VPO method
Free phenol: Gas chromatography
Bulk density: Calculated from the following formula:

Bulk density = $\frac{W \ (g)}{100.48 \ (cm^3)}$ (where W is the weight of a sample filled in a cylindrical vessel measuring 4 cm in diameter and 8 cm high).
(2) Characteristic properties of phenolic resin composite foam.
Density: According to JIS A9514.
Compressive strength: According to JIS A9514.
Water absorption: According to JIS A9514.
Friability: According to BS4370.

Dechlorane is a trademark of Occidental Chemical Corporation used with fire retardant additives such as the diadduct of hexachlorocyclopentadiene and cyclooctadiene.

TABLE 2

Physical Properties of Phenolic Resin Composite Foam

| | Example 1 | Comparative Examples 1 | 2 | 3 | 4 |
|---|---|---|---|---|---|
| Phenolic resin composite foam material | | | | | |
| Novolak phenolic resin; prepared in Production Example 1 (parts) | 100 | | | | |
| Novolak phenolic resin; prepared in Comparative Production Example 1 (parts) | | 100 | 100 | | |
| Novolak phenolic resin; prepared in Comparative Production Example 2 (parts) | | | | 100 | 100 |
| Dinitrosopentamethylenetetramine (parts) | 10 | 10 | 10 | 10 | 10 |
| Blowing auxiliary Benzoic acid (parts) | 2 | | | | |
| Inorganic foamed particles perlite (Fuyo #7) (parts) | 220 | 220 | 220 | 220 | 220 |
| Curing and foaming reactions | | | | | |
| Heating temperature (°C.) | 180 | 180 | 180 | 180 | 180 |
| Heating time (min) | 3 | 3 | 7 | 3 | 7 |
| Phenolic resin composite foam | | | | | |
| Density (kg/m³) | 135 | 143 | 97 | 153 | 127 |
| Compressive strength (kg/cm²) | 19.9 | 5.3 | 9.3 | 13.5 | 11.6 |
| Water absorption (%) | 2.5 | 11.5 | 9.4 | 13.5 | 10.6 |
| Fiability (%) | 14 | 57 | 65 | 37 | 48 |

We claim:

1. A process for producing a phenolic resin composite foam which comprises heating at 100 to 250° C. a phenolic resin composite foam material which is composed of a powdered novolak phenolic resin having a number-average molecular weight of 250 to 600, a bulk density of 0.15 to 0.50 and containing 1 to 10% of free phenol; a chemically decomposing blowing agent; at least one kind of blowing auxiliary selected from the group consisting of urea, formic acid, oxalic acid, maleic acid, fumaric acid, benzoic acid, salicylic acid, p-hydroxybenzoic acid, and phthalic acid incorporated in an amount of 0.1 to 7 parts of weight per 100 parts by weight of the phenolic resin, and inorganic foamed particles incorporated in a ratio of phenolic resin to inorganic foamed particles from 90:10 to 10:90 by weight.

2. A process for producing a phenolic resin composite foam according to claim 1, wherein the number-average molecular weight of the novolak rein is 300 to 550.

3. A process for producing a phenolic resin composite foam according to claim 1, wherein the free phenol present in the novolak resin is 3 to 8%.

4. A process for producing a phenolic resin composite foam according to claim 1, wherein the chemical decomposing blowing agent is added in an amount of 3–20 parts by weight per 100 parts by weight of phenolic resin.

5. A process for producing a phenolic resin composite foam according to Claim 1, wherein the inorganic foamed particles have a bulk density of 0.05 to 0.5 and a particle diameter of 0.2 to 7 mm.

6. A process for producing a phenolic resin composite foam according to claim 1, wherein the inorganic foamed particles have a ratio of phenolic resin to inorganic foamed particles from 70:30 to 30:70 by weight.

7. A process for producing a phenolic resin composite foam which comprises heating at 100 to 250° C. a phenolic resin composite foam material which is composed of a powdered novolak phenolic resin having a number-average molecular weight of 300 to 550, a bulk density of 0.15 to 0.50 and containing 3 to 8% of free phenol; a blowing agent added in an amount of 3–20 parts by weight per 100 parts by weight phenolic resin; at least one kind of blowing auxiliary selected from the group consisting of urea, formic acid, oxalic acid, maleic acid, fumaric acid, benzoic acid, salicylic acid, p-hydroxybenzoic acid, and phthalic acid incorporated in an amount of 0.1 to 7 parts by weight per 100 parts by weight of the phenolic resin, and inorganic foamed particles incorporated in a ratio of phenolic resin to inorganic foamed particles from 70:30 to 30:70 by weight.

8. A process for producing a phenolic resin composite foam according to claim 7, wherein the inorganic foamed particles have a bulk density of 0.05 to 0.5 and a particle diameter of 0.2. to 7 mm.

* * * * *